(12) United States Patent
Lee

(10) Patent No.: US 9,600,868 B2
(45) Date of Patent: Mar. 21, 2017

(54) IMAGE UPSAMPLING USING LOCAL ADAPTIVE WEIGHTING

(71) Applicant: TMM, Inc., Wilmington, DE (US)

(72) Inventor: Vitus Lee, Vancouver (CA)

(73) Assignee: TMM, Inc., Wilmington, DE (US)

( * ) Notice: Subject to any disclaimer, the term of this patent is extended or adjusted under 35 U.S.C. 154(b) by 0 days.

(21) Appl. No.: 14/847,604

(22) Filed: Sep. 8, 2015

(65) Prior Publication Data

US 2016/0078601 A1   Mar. 17, 2016

Related U.S. Application Data

(60) Provisional application No. 62/049,667, filed on Sep. 12, 2014.

(51) Int. Cl.

| | | |
|---|---|---|
| G06K 9/40 | (2006.01) | |
| G06T 5/00 | (2006.01) | |
| G06T 3/40 | (2006.01) | |
| H04N 7/01 | (2006.01) | |
| H04N 1/40 | (2006.01) | |
| H04N 9/64 | (2006.01) | |

(52) U.S. Cl.
CPC ............ G06T 5/004 (2013.01); G06T 3/4038 (2013.01); H04N 1/40068 (2013.01); H04N 7/0117 (2013.01); H04N 9/646 (2013.01); G06T 2207/20192 (2013.01)

(58) Field of Classification Search
CPC ...... H04N 19/33; H04N 19/187; H04N 19/59; G06T 3/4007; G06T 2207/20016
See application file for complete search history.

(56) References Cited

U.S. PATENT DOCUMENTS

| | | | | |
|---|---|---|---|---|
| 2002/0176113 A1* | 11/2002 | Edgar | ..................... | G06T 5/004 358/3.27 |
| 2013/0077887 A1* | 3/2013 | Elton | .................... | G06T 3/4053 382/264 |
| 2014/0086319 A1* | 3/2014 | Xu | ......................... | H04N 19/30 375/240.12 |

* cited by examiner

Primary Examiner — Eueng-Nan Yeh
(74) Attorney, Agent, or Firm — Merchant & Gould, PC

(57) ABSTRACT

Systems and methods are disclosed for performing local adaptive weighting upsampling. An image may be converted into a color space representation. The color space representation of the image may then be divided into the individual color spaces. Upsampling may then be performed on the individual color planes. The upsampling may include resizing the color planes by adding pixels to the color planes. Local processing of the different color spaces may be performed to estimate values for the added pixels. Upon generating the estimated values, the estimated values may be refined by determining which known pixel values from the original image have the highest degree of influence on a newly added pixel.

20 Claims, 8 Drawing Sheets

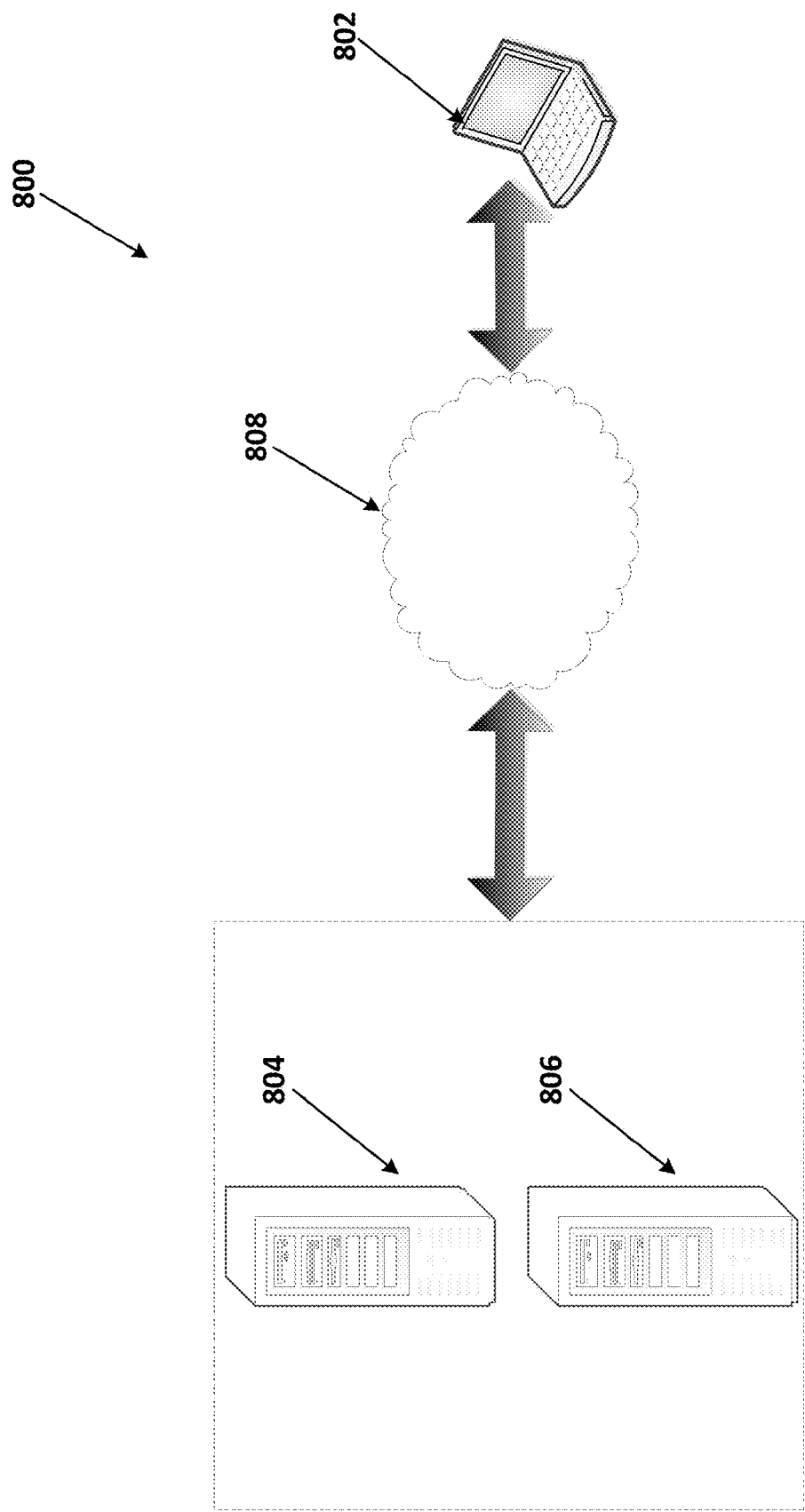

IMAGE UPSAMPLING USING LOCAL ADAPTIVE WEIGHTING

BACKGROUND

With the proliferation of computing devices, it is becoming more common for users to view content across many different types of devices. For example, a user may begin consuming content, such as an image or video on her mobile device. However, at some point she may want to consume the content on a device having a different form factor, such as a laptop or television. It is with respect to this general environment that embodiments of the present technology have been contemplated.

SUMMARY

Embodiments of the present disclosure relate to a method of performing localized upsampling of an image comprising: splitting an image into a plurality of color planes, wherein splitting the image comprises determining at least a first color plane; resizing the first color plane, wherein resizing the first color plane comprises adding a plurality of new pixels to the first color plane, the first color plane comprising at least a first localized portion, wherein the first localized portion comprises: at least a first new pixel; a first known pixel having a first value; and a second known pixel having a second value; generating an estimated value for the first new pixel, wherein the estimated value is based on the first value and the second value; refining the estimated value; and merging the first color plane with the plurality of color planes.

Additional embodiments of the present disclosure relate to a computer storage medium encoding computer executable instructions that, when executed by at least one processor, perform a method of performing localized upsampling of an image, the method comprising: converting an image into a color space; splitting the image, wherein splitting the image comprises generating a first color plane; resizing the first color plane, wherein resizing the first color plane comprises adding a plurality of new pixels to the first color plane, the first color plane comprising at least a first localized portion, wherein the first localized portion comprises: at least a first new pixel; a first known pixel having a first value; and a second known pixel having a second value; generating an estimated value for the first new pixel, wherein the estimated value is based on the first value and the second value; refining the estimated value; and merging the first color plane with the plurality of color planes.

Further embodiments of the present disclosure relate to a system comprising: at least one processor; and memory encoding computer executable instructions that, when executed by the at least one processor, perform a method of performing localized upsampling of an image, the method comprising: converting an image into a color space; splitting the image, wherein splitting the image comprises generating a first color plane; resizing the first color plane, wherein resizing the first color plane comprises adding a plurality of new pixels to the first color plane, the first color plane comprising at least a first localized portion, wherein the first localized portion comprises: at least a first new pixel; a first known pixel having a first value; and a second known pixel having a second value; generating a first estimated value for the first new pixel, wherein the first estimated value is based on the first value and the second value; refining the first estimated value; and merging the first color plane with the plurality of color planes.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

FIG. 8 is an embodiment of an exemplary network in which the various systems and methods disclosed herein may operate.

DETAILED DESCRIPTION

With the proliferation of computing devices, content consumed by users is often consumed across different devices. However, in many instances, content is generated for a specific form factor. Content may be generated and/or formatted for a specific screen size or resolution. For example, content may be generated for SDTV, HDTV, and UHD resolution. When content is transferred between different devices, it may be necessary to reformat the content for display on the different device. With respect to visual content, such as images or videos, content generated for a lower resolution device (e.g., content for mobile devices, SDTV content, etc.) may have to be altered when displayed on a higher resolution device, such as a HD television or a UHD television. One way of converting visual content is by performing upsampling of the content. However, upsampling may be computationally intensive. Because of this, many devices may not have the processing power required to perform upsampling and/or lack the necessary computational resources to perform upsampling in real-time. Such devices include, but are not limited to, mobile devices such as smartphones and tablets, set-top boxes, and/or televisions.

Embodiments of the present disclosure provide systems and methods for performing image upsampling using local adaptive weighting. The embodiments disclosed herein may be employed by devices that may not have the computational resources to perform upsampling in real-time or, in some instances, perform any upsampling at all. In embodiments, an image that requires upsampling may be converted into a color space representation. Exemplary color spaces include, but are not limited to, the RGB color model, YUV color model, the YCbCr color model, etc. The image may then be separated into separate color planes which may be independently upsampled. Furthermore, in embodiments, upsampling of the color space may be performed on localized portions (e.g., blocks of pixels) of each color plane. The localized portions may be upsampled serially or in parallel. Once each of the color spaces have been upsampled, they may be merged into an upsampled image.

Figure 1:
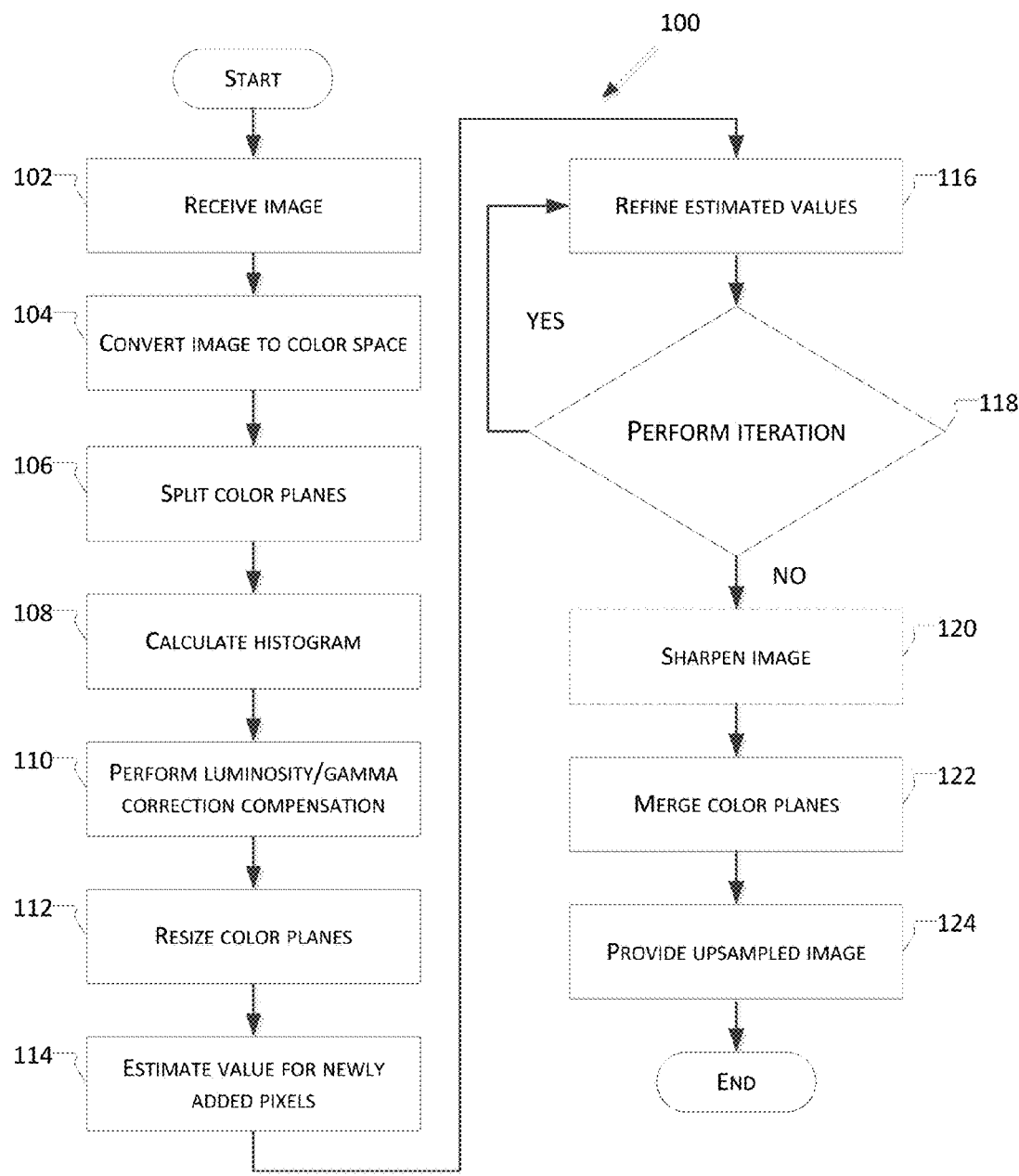
FIG. 1 is an embodiment of a method for performing image upsampling using local adaptive weighting.

FIG. 1 is an embodiment of a method 100 for performing image upsampling using local adaptive weighting. In embodiments, the method 100 may be implemented in software, hardware, or a combination of software and hardware. The method 100 may be performed by a device such as, for example, a mobile device or a television. In embodiments, the method 100 may be performed by one or more general computing devices. Flow begins with operation 100 where an image that requires upsampling is received. In embodiments, the image may be received from another application and/or device. In embodiments, the image received at operation 102 may be received from a remote device via a network. In other embodiments, receiving the image at operation 102 may include retrieving the image from local storage. Furthermore, in one embodiment, the image received at operation 102 may be a standalone image, such as, for example, a bitmap image, a JPEG image, etc. One of skill in the art will appreciate that the image received at operation 102 may be encoded using any type of image format without departing from the spirit of this disclosure. In other embodiments, the image received at operation 102 may be part of a series of images. For example, the image received at operation 102 may represent a single frame from a video. While the embodiments described herein are described with respect to performing upsampling on video frames or still images, other type of data may be upsampled. For example, raw data, partially processed data, and/or sensor data may be received at operation 102. For example, the image data may be received from a camera sensor and upsampled prior to or as a part of creating an image or video frame.

Upon receiving the image, flow continues to operation 102 where the received image is converted to be represented as a color space or model. For example, the image received at operation 102 may be converted to a RGB color space representation. An RGB color space representation is a color model in which each pixel that makes up the image is encoded using three values, a red value, a green value, and a blue value. In embodiments, an 8-bit representation may be used. In such embodiments, each RGB value may be represented by a number between 0-255, inclusive. In other embodiments, the RGB values may be represented using more or fewer bits (e.g., 16-bit values, 24-bit values, 32-bit values, 48-bit values, etc.). In alternate embodiments, the image may be converted to the YUV color space. A YUV color model defines a pixel in term of a single luma value (Y) and two chrominance values (U and V). In such embodiments, the YUV values may be 8-bit values, 16-bit values, 24-bit values, 32-bit values, etc. While specific color models are discussed herein, one of skill in the art will appreciate that other color models or spaces may be employed without departing from the spirit or scope of this disclosure. For example, the image may be converted using the YCbCr color model, the YPbPr color model, the Y'IQ color model, etc., without departing from the scope of this disclosure. In alternate embodiments, if the image data received at operation 102 was represented using a color space, the conversion at operation 104 may not be performed or, alternatively, a conversion to an alternate color space may be performed at operation 104.

Flow continues to operation 106 where the image is split into the separate color planes. Splitting the image into separate color planes may comprise determining the different color planes for the image. For example, if the image was converted to an RGB color representation, splitting the image into the separate color planes may include splitting the image into three separate color planes, the red color plane, the green color plane, and the blue color plane. For example, one color plane may contain only the red value of pixels, a second color plane may contain only the green value of pixels, and finally, a third color plane may contain only the blue value of pixels. In alternate embodiments, if other color models are used to represent the image, the image may be separated based upon the specific components for the color model at operation 106. For example, if the image was converted to a YUV color representation, the image may be broken into a plane containing only the Y value for pixels, a plane with only the U value for the pixels, and a plane with only the V value for pixels. The number of color planes that the image may be divided into at operation 106 depends on the number of components in the color space model that the image may have been converted to at operation 104.

In embodiments, separation of the image into its different color space components at operation 106 may provide processing efficiencies. For example, less processing may require to upsample an individual color space due to the fact that each color space of the image consists of less data than the image as a whole. This may allow devices with less resources (e.g., less memory, less processing power, etc.) to perform the image upsampling. Furthermore, in multiprocessor environments, the different color spaces may be upsampled in parallel, thereby decreasing the amount of time required to upsample the image. The reduction in processing time may allow for the upsampling of images that make up video because the upsampling may be performed in real-time. While specific benefits of dividing an image into separate color planes have been described herein, one of skill in the art will appreciate that the described benefits are exemplary benefits provided by the systems and methods disclosed herein. Furthermore, one of skill in the art will recognize additional benefits that are provided by the system and methods disclosed herein.

Flow continues to operation 108 where a histogram is calculated. In one embodiment, a single histogram may be calculated for the entire image. In an alternate embodiment, one or more histograms may be calculated for each color plane that the image was split into at operation 106. In embodiments, when an image is upsampled, the luminosity of the upsampled image should be the same as the luminosity of the original image. However, testing has shown that, due to human perception of colors, when the upsampled image is viewed at the same distance as the original image, the colors of the upsampled image appear washed out. The luminosity of the upsampled image may be adjusted to compensate for the perception fallacy. In embodiments, an average intensity may be calculated using the one or more histograms generated at operation 108. In embodiments, flow continues to operation 110 where the luminosity and/or gamma correction compensation is performed based upon the one or more histograms. In one embodiment, an average intensity may be determined using the one or more histograms. If a single histogram was generated for the entire image, the average intensity calculated for the entire image may be applied to the each color plane that the image was divided into at operation 108. Alternatively, if a histogram for each color plane of the image was calculated at operation 108, an average intensity may be calculated for each individual color plane. In embodiments, after calculating one or more average intensities, an adjustment value may be calculated based upon the average intensity and the zoom factor for the upsampled image. As described above, a single adjustment value may be calculated and applied to each color plane, or a different adjustment value may be calculated for each color plane. In one embodiment, the calculated adjustment value may be proportional to the zoom factor of the upsampled image. In embodiments, the adjustment may increase or reduce the intensity. The luminosity adjustment factor is calculated as per aforementioned method. This factor is expressed as a percentage factor of the original average intensity. The algorithm also gives users a chance to manually set a preferred factor based on the perceived color wash-out effect. This is similar to adjusting the luminosity and chrominance on a TV set. In other embodiments, the increase or reduction in intensity may be based upon a perceived color washed out effect. In embodiments, the luminosity adjustment factor may be calculated based upon an average intensity calculated based on the image histogram. A determination may be made, based upon the histogram, whether the image is a bright image or a dull image, or whether portions of the image are bright or dull. A luminosity adjustment may be based upon such characteristics. In other embodiments, for example, if the image is too complex to make such determinations, a predefined luminosity adjustment may be used. The predefined adjustment may be applied to an entire video or to a group of pictures that make up the video. In still further embodiments, the adjustment image may be manually set by a user. While specific examples of calculating one or more adjustment values, one of skill in the art will appreciate that different formulas may be used to calculate an adjustment value without departing from the spirit of this disclosure. Once the one or more adjustment values are calculated, the adjustment values may be used to perform luminosity and/or gamma correction compensation on the one or more color planes.

For clarity of explanation, the operations 112, 114, and 116 are described with respect to a local portion of an image. One of skill in the art will appreciate that an image may comprise multiple local portions. The number of local portions in the image may depend on the size of the localized portion. Thus, while operations 112, 114, and 116 are described with respect to an individual localized portion, one of skill in the art will appreciate that the operations may be performed on each localized portion of the image. As such, the method 100 may additionally include identifying a plurality of localized portions of the image. The upsampling operations described with respect to operations 112-116 may then be performed on each localized portion. In embodiments, the operations on the different localized portions may be performed in parallel or sequentially. For example, if an image is divided into 5 pixel by 5 pixel blocks, operations 112-116 may be performed on each 5 by 5 square of pixels. In one embodiment, processing may begin at the top left portion of the image and then move sequentially through each 5 by 5 block of pixels in the image until the entire image has been processed. However, processing could begin in other sections of the image (e.g., bottom right, center, top right, etc.) without departing from the scope of this disclosure. Alternatively, each 5 by 5 block of pixels may be processed in parallel. While the disclosure discusses the localized portions comprising a 5 by 5 block of pixels, one of skill in the art will appreciate that other block sizes may be employed by the method 100 (e.g., 2 by 2, 3 by 3, 10 by 10, 100 by 100, etc.).

Figure 2:
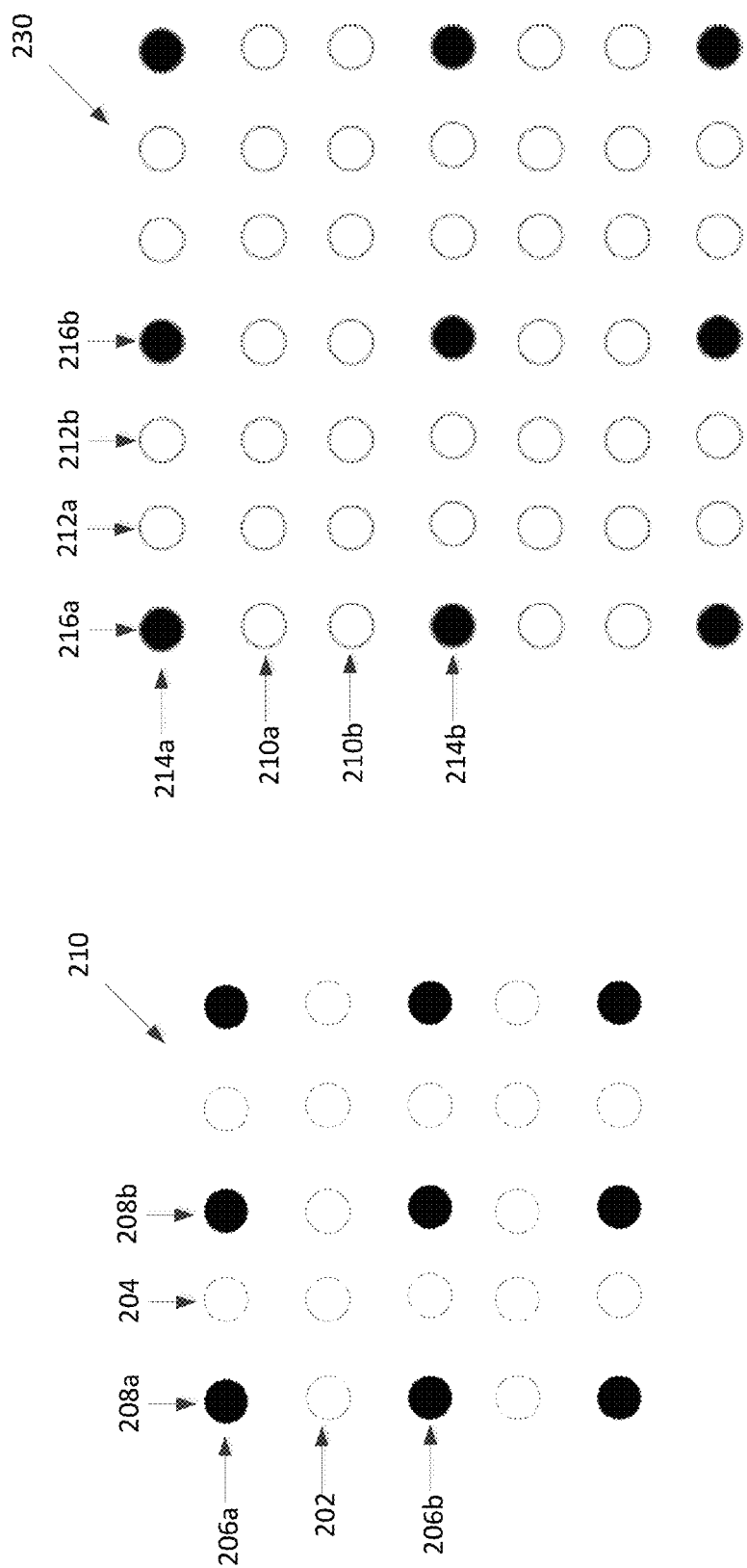
FIG. 2A provides an exemplary representation of a localized portion of a resized color plane based upon an upsampling zoom factor of 2×.
FIG. 2B provides an exemplary representation of a localized portion of a resized color plane based upon an upsampling zoom factor of 3×.

Flow continues to operation 112 where the image planes are resized. In embodiments, the method 100 is performed on localized portions of an image. The image planes may be resized according to a zoom factor for the upsampled image. For example, FIG. 2A provides an exemplary representation of a localized portion 220 of a resized color plane based upon an upsampling zoom factor of 2×. In the depicted embodiment, the filled in circles represent pixel values from the original image while the hollow circles represent the newly created pixels of the upsampled images. The 2× upsampled localized portion 220 may be created by inserting a new row of pixels (e.g., row 202) between each original row of pixels (e.g., rows 206a and 206b) of the original image and inserting a new column of pixels (e.g., column 204) between each original column of pixels (e.g., columns 208a and 208b) of the original image. As another example, FIG. 2B provides an exemplary representation of a localized portion 230 of a resized color plane based upon an upsampling zoom factor of 3×. In the depicted embodiment, the filled in circles represent pixel values from the original image while the hollow circles represent the newly created pixels of the upsampled images. The 3× upsampled localized portion 230 may be created by inserting two new rows of pixels (e.g., rows 210a and 210b) between each original row of pixels (e.g., rows 214a and 214b) of the original image and inserting two new columns of pixels (e.g., columns 212a and 212b) between each original column of pixels (e.g., columns 216a and 216b) of the original image. While depictions of 2× and 3× color planes are illustrated in FIGS. 2A and 2B respectively, one of skill in the art will appreciate that other zoom factors (e.g., 4×, 5×, 10×, 100×, etc.) may be used to resize the color planes without departing from the scope of this disclosure. In embodiments, upsampling to larger zoom factors may include multiple upsampling operations using smaller zoom factors. For example, 4× upsampling may be performed by initiating a 2× upsampling on the original image followed by another 2× upsampling on the resulting image. Similarly, a 6× upsampling may be performed as a 2× upsampling on an original image followed by a 3× upsampling on the resulting image. Performing successive upsampling may provide better end results. For example, referring to 2× upsampling, estimating a value for a single pixel is less complex of an operation that provides a better estimated value which, in turn, may require less refinement. In embodiments, each color plane generated at operation 106 may be resized at operation 112. In alternate embodiments, fewer than all of the color planes generated at operation 106 may be resized at operation 112.

Figure 3:
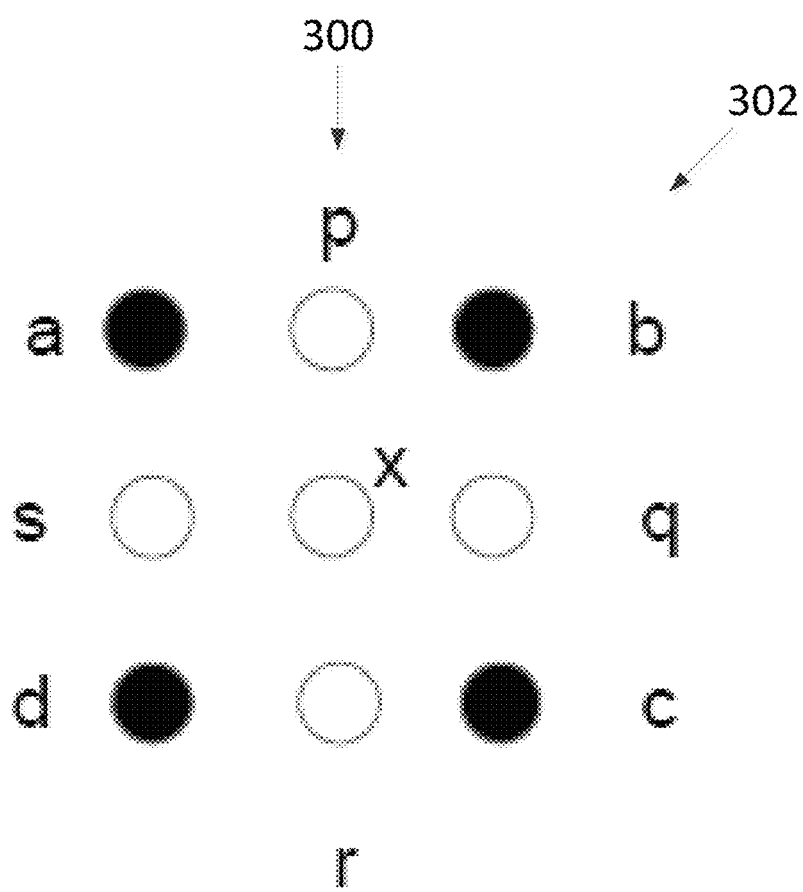
FIG. 3 is an embodiment of an exemplary expanded local portion of a resized color plane.

As illustrated in the exemplary resized color planes 220 and 230 depicted in FIGS. 2A and 2B, in embodiments, resizing the color plane adds additional pixels to the color planes of the original image. Flow continues to operation 114 where an estimated value (e.g., color) is determined for the newly added pixels. In one embodiment, the estimated value may be determined based upon the values of known peripheral pixels (e.g., the surrounding original pixels). For example, turning now to FIG. 3, an expanded local portion 300 of an exemplary resized color plane (or image) is provided. The exemplary expanded local portion 300 contains nine pixels 302 identified as pixels a, b, c, d, p, q, r, s, and x. In the exemplary resized color plane, pixels a, b, c, and d are known pixels from an original image and have a known pixel value (e.g., a known red value, green value, blue value, luma value, etc.). In the depicted embodiment, pixels p, q, r, s, and x, are newly added pixels, or, in other words, pixels added to the image during resize operation 112. In embodiments, an estimated value may be calculated or determined for newly added pixels p, q, r, s, and x, based on the known values of pixels a, b, c, d. In embodiments, the estimated value for a new pixel may be determined based upon known peripheral values. For example, the estimated value of pixel p may be determined based upon the values of pixels a and b, the estimated value of pixel q may be determined based on the values of pixels b and c, the estimated value of pixel r may be determined based upon the values of pixels c and d, and the estimated value of pixel s may be determined based upon the values of pixels d and a. In the depicted embodiment, pixel x may be determined based upon the values of pixels a, b, c, and d.

In one embodiment, the estimated values may be determined by averaging the values of the peripheral pixels. For example, the estimated value of pixel p may be the average of pixel values a and b while the estimated value of pixel x may be the average of pixel values a, b, c, and d. In other embodiments, rather than taking an average of the peripheral pixel values, the estimated value may be determined based on a formula that takes the pixel values of peripheral pixels and outputs an estimated value. Furthermore, in alternate embodiments, such as, for example, a 3× expanded localized region which included two newly added pixels between known pixel values (e.g., newly added pixel 210a and 210b between original pixels 214a and 214b of FIG. 2B) the estimated values may be weighted such that the estimated value of a newly added pixel may be influenced more by the nearest known pixel. For example, the estimated pixel value of pixel 210a from FIG. 2B may be influenced more by the pixel value of 214a than the pixel value of pixel 214b from FIG. 2B. While specific methods of determining or calculating an estimated value of a newly added pixel have been disclosed herein, one of skill in the art will appreciate that any type of method, formula, calculation, etc. may be employed to determine or calculate an estimated pixel value for a newly added pixel without departing from the spirit or scope of this disclosure.

Upon determining estimated values for the newly added pixels, flow continues to operation 116 where the estimated values are refined. In embodiments, refining the estimated values may include applying one or more smoothing algorithms, applying a filter to the expanded image, performing edge detection, performing color blending, etc. In one embodiment, operation 116 may include determining whether the local portion includes an edge. One of skill in the art will appreciate that any method of color and/or image refinement may be employed at operation 116.

Figure 4:
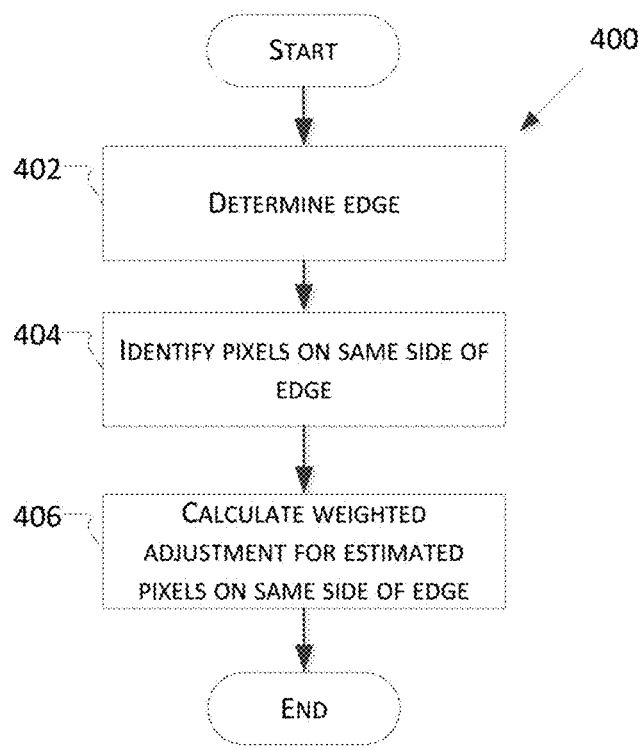
FIG. 4 illustrates an exemplary method for detecting edges in a local portion of a resized color plane.
Figure 5:
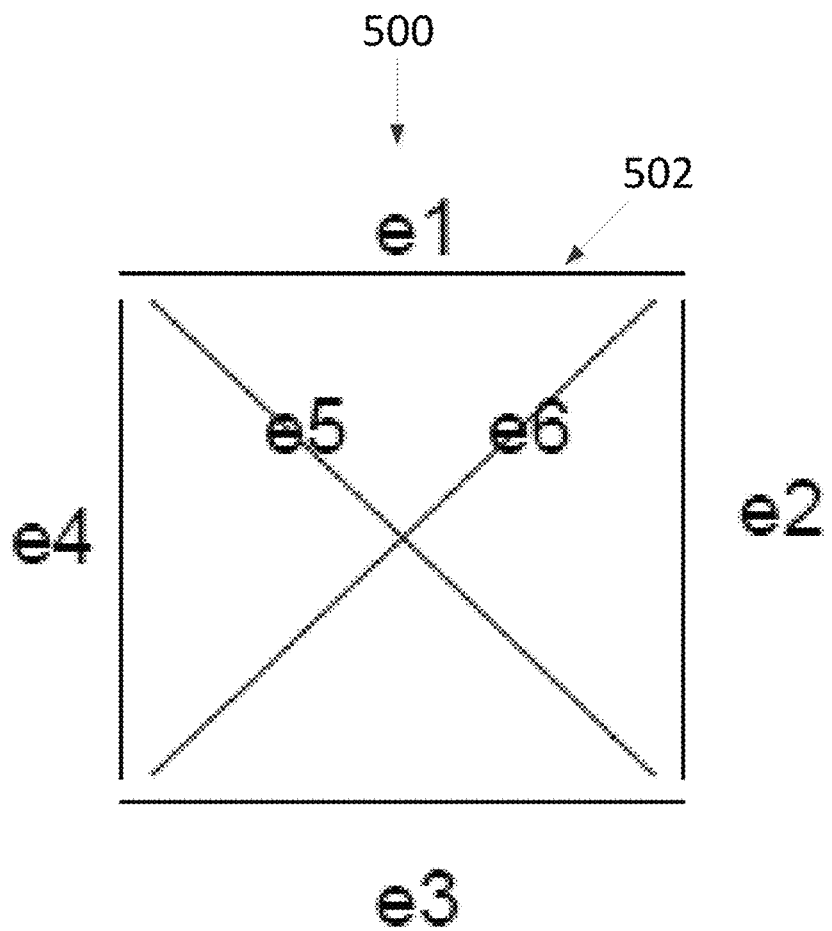
FIG. 5 is an exemplary illustration of potential edges in a local portion of a resized color plane.

For example, FIG. 4 illustrates an exemplary method 400 of edge detection which may be performed at operation 116. In embodiments, the method 400 may be implemented in software, hardware, or a combination of software and hardware. Flow begins at operation 402. At operation 402, the pixel values of the local portion of the resized color plane (or image) may be analyzed to determine whether or not an edge is present in the local portion. Referring briefly to FIG. 5, an exemplary embodiment of a local portion 500 is illustrated highlight the location of possible edges 502 within the local portion. In the exemplary embodiment, potential edges e1, e2, e3, e4, e5, and e6 are illustrated. Potential edges e1, e2, e3, and e4 are located at the boundaries of the local portion while edges e5 and e6 are edges that diagonally cross the local portion. As such, there may be ten different cases that an edge detection algorithm accounts for:

1) There are no edges.
2) Edges e1 and e2 are the same.
3) Edges e2 and e4 are the same.
4) Edges e5 and e6 are the same.
5) Edge is at e1.
6) Edge is at e2.
7) Edge is at e3.
8) Edge is at e4.
9) Edge is at e5.
10) Edge is at e6.

In the first case, the local portion may be uniform. In such instances, the value of the middle pixel or pixels may be dependent on the known edge pixels. For example, referring to FIG. 3, in the uniform instance the newly added pixel x's value is based on the values of pixels a, b, c, and d.

In embodiments, the edge detection operation 402 may determine whether or not an edge exists by determining a difference in intensity between the known pixel values. In embodiments, the known pixel values may be mathematically compared, such as, for example, by subtracting the value of one pixel from another pixel. In embodiments, an absolute value of the difference is determined. The absolute value of pixel difference may be compared to a predetermined threshold. If the absolute value in pixel difference is greater than the predetermined threshold, then an edge exists between the two pixels. In embodiments, the predetermined threshold value may be adjusted. For example, the smaller the value of the predetermined threshold, the more accurate the edge detection which, in turn, will result in a shaper refinement of the newly added pixel values by the method 400. However, smaller predetermined thresholds may require additional processing of the upsampled image. As such, the predetermined threshold may be set to most efficiently balance image quality with processing requirement. As such, setting of the predetermined threshold may be based upon the application related to the image upsampling. For example, if the image being upsampled is a frame in a video, it may be more important to quickly perform the upsampling in order to provide smooth playback. Additionally, if the image is a frame in a video playback, the quality of the upsampling may not be as crucial due to the fact that the upsampled image is momentarily displayed. As such, if the upsampling is performed for a video playback application, the predetermined threshold may be set higher. Conversely, if the image being upsampled is a still image, such as, for example, a photograph, then the quality of the upsampled image may be more important. As such, the predetermined threshold may be set lower to provide a sharper upsampled image. In other embodiments, the predetermined threshold may be set based upon the processing power of the device performing the method 400.

Upon determining the existence of an edge, flow continues to operation 404 where a determination is made regarding which pixels of the local portion are on the same side of the edge. Pixels on the same side of an edge may be similar. In other words, if two pixels are on the same side of an edge, their values and characteristics are similar. In certain circumstances, for example, when there is no edge or the edge is on an outer boundary of the local portion, all of the pixels in the local portion may automatically be identified as being on the same side of the edge. However, in instances where an edge bisects the local portion, such as a diagonal edge (e.g., edges e5 or e6 from FIG. 5), then operation 404 may include determining which pixels are on the inside of the edge and which pixels are on the outside of the edge. In one embodiment, such a determination may be made by comparing absolute differences between pixels on each side of the edge. For example, referring to known pixels a, b, c, and d from FIG. 3, a determination of which pixels are on the inside of the edge may be performed by calculating an absolute difference between pixel b with pixel a and pixel c compared to the absolute difference between pixel d with pixel a and pixel c. Pixels on the inside of the edge (e.g., on the same side of an edge) will have a smaller absolute difference than pixels on different sides of the edges. In alternate embodiments, the inside and outside of an edge may be determined using vector calculus to determine the gradient on each side of an edge.

After determining which pixels are on the same side of an edge, flow continues to operation 406 where a weighted adjustment may be calculated for the estimated pixel values of pixels on the same side of an edge. In one embodiment, a weighted adjustment may be based on deviation from a median intensity value between pixels on the same side. For example, an 8-bit representation of a pixel may have a value between 0 and 255 with 127 being the median value. A deviation from the median value of 127 may be calculated for each known pixel values that are on the same side as the estimated pixel value that is being refined for a newly added pixel. The known pixels with a smaller deviation from the median may have a higher degree of influence on the pixel value being refined. As such, a weighted adjustment may be determined that gives more weight to the value of the known pixel with a higher degree of influence on the newly added pixel. In alternate embodiments, other methods of calculating a weighted adjustment may be performed at operation 406. For example, a partial differential equation may be employed to provide a weighted adjustment to the estimated pixel value at operation 406. In embodiments, the partial differential equations may be solved prior to performing the method 400. In such embodiments, the solutions of the partial differential equations may be used at operation 406. As such, partial differential equations may be used without adding to the complexity of the method 400 and/or without adding additional time to the upsampling process. One of skill in the art will appreciate that other methods of applying a weighted adjustment may be performed at operation 406 without departing from the scope of this disclosure. In embodiments, the operations described with respect to FIG. 4 may be performed on the newly added pixels, e.g. the pixels of newly added row 202 and column 204 of FIG. 2A. In such embodiments, other than optionally modifying the luminosity (as described with respect to operation 110 of FIG. 1) there is no need to operate or otherwise modify the original pixel values of the original image. As such, the number of operations and/or calculations require to perform upsampling may be reduced.

Returning back to FIG. 1, after the estimated pixel values for each newly added pixel are refined at operation 116, flow continues to decision operation 118 where a determination is made as to whether to perform an additional iteration of refinement is made. In embodiments, the determination of whether or not to perform the iteration may be based off of application type, image type (e.g., video frame or still image), device processing power, or any other considerations commonly accounted for when performing image upsampling. In embodiments, performing the additional iteration may result in higher quality of the upsampled image. This is due to the fact that the previously refined values are then used to perform further refinement, which may lead to better refinement results. If another iteration is to be performed, flow branches YES and returns to operation 116. Otherwise, flow branches NO to optional operation 120.

At optional operation 120, one or more of the resized color planes from may be sharpened. In embodiments, applying a sharpening filter may be dependent upon the zoom factor of the upsampling. For example, higher zoom factors may require additional sharpening of the image. In one embodiment, the sharpening filter may be a Gaussian blur filter. In alternate embodiments, other image sharpening techniques may be performed at optional operation 120, such as, for example, application of an unsharp masking technique (e.g., an unsharp masking filter). One of skill in the art will appreciate that any type of sharpening technique may be applied at operation 120.

Flow continues to operation 122 where the color planes are merged back into an upsampled image. As previously described, performing the upsampling on each color plane individually may lead to processing efficiencies. In other words, operation s 108-120 may be performed for each individual color plane generated at operation 106. Once each color plane has been upsampled, they may be merged back to create the final upsampled image. Merging the color planes may be performed by merging the different values from each color plane for a pixel. For example, when working in the RGB color space, merging the color planes at operation 122 may include combining the red, green, and blue pixel values of the pixels in each color plane. After the color planes are merged at operation 122, flow continues to operation 124 where the final upsampled image is provided. Providing the upsampled image may include storing the upsampled image, sending the upsampled image to another application or process, etc.

While embodiments described herein have been described with respect to images that include three planes (e.g., RGB images, YUV images, etc.) one of skill in the art will appreciate that the methods disclosed herein may be employed with images have more or fewer planes. For example, the method 100 may be modified to perform upsampling on a greyscale image (which does not include multiple image planes). In such embodiments, there may not be a need to perform the operations 106 and 122 described with respect to FIG. 1. Additionally, the methods disclosed herein may be performed on hyperspectral and multispectral images. Furthermore, the method may be performed on images using different types of bit encoding. For example, the method may operate on images regardless of whether the pixels use 8-bit, 10-bit, 16-bit, 24-bit, etc. encoding.

Figure 6:
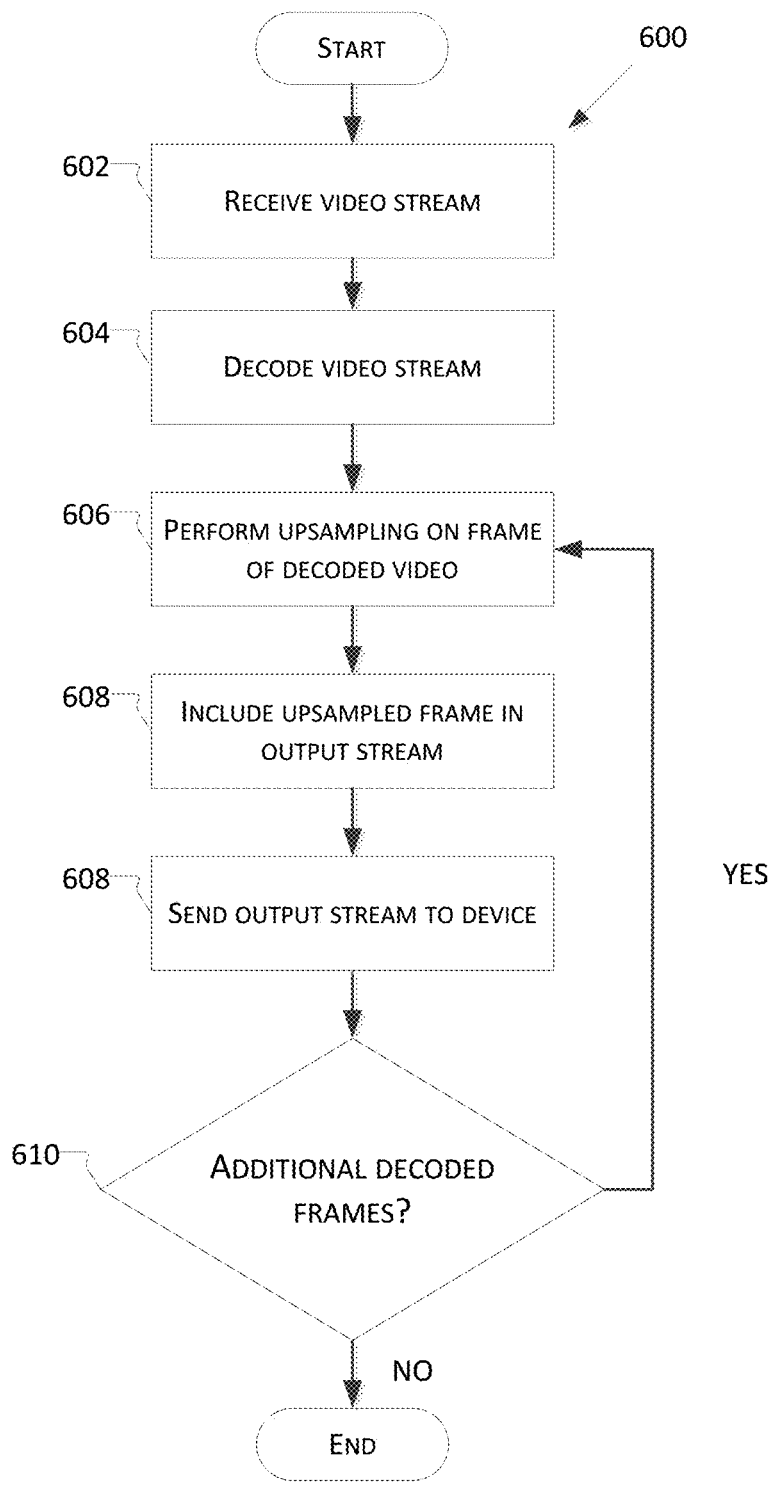
FIG. 6 is an embodiment of a method for performing local adaptive weighting upsampling on video.

FIG. 6 is an embodiment of a method 600 for performing local adaptive weighting upsampling on video. In embodiments, the method 600 may be implemented in software, hardware, or a combination of software and hardware. The method 600 may be performed by a device such as, for example, a mobile device or a television. In embodiments, the method 600 may be performed by one or more general computing devices. In one embodiment, the method 600 may be performed by a video decoder. In alternate embodiments, the method 600 may be performed by an application or module that is separate from a video decoder. Flow begins at operation 602 where a video stream is received. In embodiments, the local adaptive weighting algorithm may be performed in real-time, that is, while the video is being played. In such embodiments, a video stream may be a sequence of data (e.g., represented as bits, bytes, blocks, etc.) provided over time. For example, a data stream may be data representing a video that is provided to a video decoder for playback. However, while the method 600 is described as operating on a data stream representing a video, one of skill in the art will appreciate that the method 600 may also receive file data as an input such as, for example, if the video is stored as a sequence of decoded frames).

Flow continues to operation 604 where the video stream is decoded. In embodiments, video streams are generally encoded according to a video codec. A video codec may describe how to compress and decompress digital video. Exemplary video codecs include H.264/MPEG-4 AVC, H.263, H.262, Windows Media Video (WMV), VP6, VP7, VP8, VP9, etc. One of skill in the art will appreciate that the video stream may be encoded in any type of format without departing from the spirit of this disclosure. In embodiments, the video stream may be decoded (e.g., decompressed) by a video decoder at operation 604 to produce a clear (e.g., decoded) video stream capable of being displayed on a display device. In embodiments, the decoding operation 604 may also include decrypting the video stream if the received video stream was encrypted. Alternatively, if the video stream was not encoded, operation 604 may be skipped.

After the video stream has been decoded, flow continues to operation 606 where a video frame may be upsampled. In embodiments, a local adaptive weighting upsampling algorithm, such as the method 100 described with respect to FIG. 1, may be employed to generate an upsampled video frame. The upsampling performed at operation 606 may be performed during decoding. As such, the operation 606 may be performed simultaneously with operation 606. In other embodiments, operations 604 and 606 may be performed sequentially. In embodiments, the video frame may be generated at operation 606 prior to performing the upsampling. In other embodiments, generation of the video frame and the upsampling may be performed simultaneously. In embodiments, the upsampling may be performed in real-time, that is, while the video is being played. After generating the upsampled frame, flow continues to operation 608 where the upsampled frame is included in an upsampled output data stream. In embodiments, including the upsampled frame in an output stream may include encoding the video frame. In one embodiment, the upsampled frame may be encoded according to a video codec (e.g., H.264, VP8, etc.). In other embodiments, the output stream may be encoded for display on a specific device. One of skill in the art will appreciate that the output stream may be generated and/or encoded in any manner without departing from the spirit of this disclosure. After including the upsampled video frame in the output stream, flow continues to operation 608 where the output stream is provided to a device. In one embodiment, the output stream may be provided to a display device (e.g., a monitor, television, etc.) for display. In other embodiments, the video output stream may be provided to a storage device (e.g., a hard drive, a solid state drive, a DVD, etc.) and stored for later playback. In still further embodiments, sending the output stream to a device may include sending the output stream to multiple devices (e.g., multiple display devices and/or multiple storage devices). Flow continues to decision operation 610 where a determination is made as to whether there are more frames that need to be upsampled. If there are, flow branches YES to operation 606 and the method repeats from there. If all of the video frames have been upsampled, flow branches NO and the method 600 completes.

Figure 7:
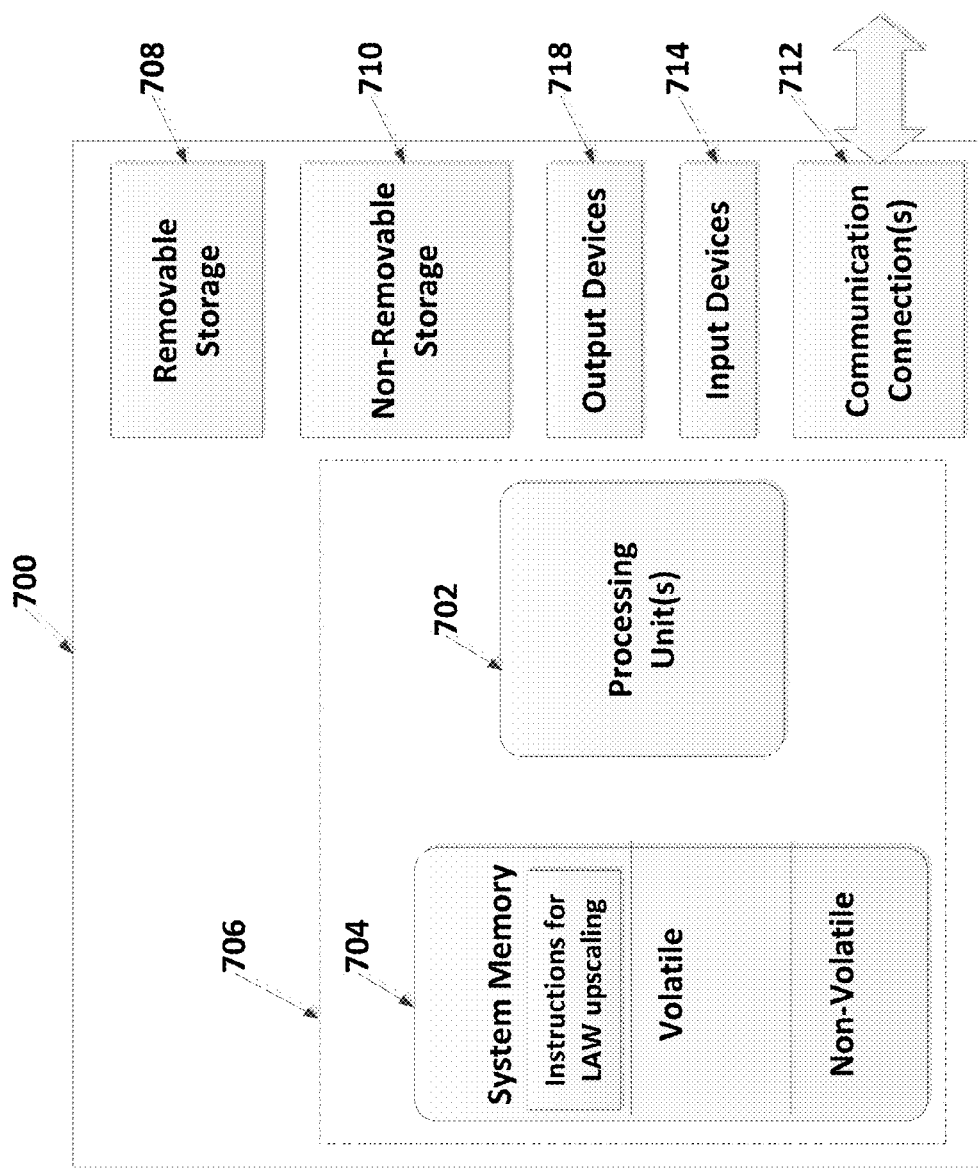
FIG. 7 illustrates one example of a suitable operating environment in which one or more of the present embodiments may be implemented.

Having described various embodiments of systems and methods that may be employed to perform image upsampling using local adaptive weighting, this disclosure will now describe an exemplary operating environment that may be used to perform the systems and methods disclosed herein. FIG. 7 illustrates one example of a suitable operating environment 700 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, instructions to perform the LAW upsampling embodiments disclosed herein, etc.) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections, 712, such as LAN, WAN, point to point, etc. In embodiments, the connections may be operable to facility point-to-point communications, connection-oriented communications, connectionless communications, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

FIG. 8 is an embodiment of a system 800 in which the various systems and methods disclosed herein may operate. In embodiments, a client device, such as client device 802, may communicate with one or more servers, such as servers 804 and 806, via a network 808. In embodiments, a client device may be a laptop, a personal computer, a smart phone, a PDA, a netbook, a netbook, a tablet, a phablet, a convertible laptop, a television, or any other type of computing device, such as the computing device in FIG. 6. In embodiments, servers 804 and 806 may be any type of computing device, such as the computing device illustrated in FIG. 6. Network 808 may be any type of network capable of facilitating communications between the client device and one or more servers 804 and 806. Examples of such networks include, but are not limited to, LANs, WANs, cellular networks, a WiFi network, and/or the Internet.

In embodiments, the various systems and methods disclosed herein may be performed by one or more server devices. For example, in one embodiment, a single server, such as server 804 may be employed to perform the systems and methods disclosed herein. Client device 802 may interact with server 804 via network 808 in order to access data or information such as, for example, an image that requires upsampling. In further embodiments, the client device 806 may also perform functionality disclosed herein.

In alternate embodiments, the methods and systems disclosed herein may be performed using a distributed computing network, or a cloud network. In such embodiments, the methods and systems disclosed herein may be performed by two or more servers, such as servers 804 and 806. In such embodiments, the two or more servers may each perform one or more of the operations described herein. Although a particular network configuration is disclosed herein, one of skill in the art will appreciate that the systems and methods disclosed herein may be performed using other types of networks and/or network configurations.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method of performing localized upsampling of an image, the method comprising:
   resizing a first color plane from the image, wherein resizing the first color plane comprises adding a plurality of new pixels to the first color plane, the resized first color plane comprising at least a first localized portion, wherein the first localized portion comprises:
      at least a first new pixel;
      a first known pixel having a first value; and
      a second known pixel having a second value;
   generating an estimated value for the first new pixel, wherein the estimated value is based on the first value and the second value;
   refining the estimated value;
   using the refined estimated value for the first new pixel of the resized first color plane; and
   providing an upsampled image comprising the resized first color plane.

2. The method of claim 1, wherein generating the estimated value comprises averaging the first and second value.

3. The method of claim 1, wherein refining the estimated value further comprises:
   determining an edge in the first localized portion;
   identifying at least one known pixel on the same side of the edge as the first new pixel; and
   adjusting the estimated value of the first new pixel based on the at least one known pixel.

4. The method of claim 1, further comprising:
   prior to resizing the first color plane, splitting the image into a plurality of color planes from a color space, wherein the plurality of color planes comprises the first color plane; and
   prior to providing the upsampled image, merging the plurality of color planes to create the upsampled image.

5. The method of claim 4, wherein the color space is one of:
   an RGB color model;
   a YUV color model;
   a YCbCr color model;
   a YPbPr color model; and
   a Y'IQ color model.

6. The method of claim 4, wherein the image comprises one of:
   a video frame;
   a still image;
   raw data;
   partially processed data;
   sensor data.

7. The method of claim 4, further comprising, prior to merging the first color plane with the plurality of color planes, applying a sharpening filter to the first color plane.

8. The method of claim 7, wherein the sharpening filter comprises one of:
   a Gaussian blur filter; and
   an unsharp masking filter.

9. A computer storage medium encoding computer executable instructions that, when executed by at least one processor, perform a method of performing localized upsampling of an image, the method comprising:

converting an image into a color space;
splitting the converted image, wherein splitting the image comprises generating a first color plane and a plurality of additional color planes;
resizing the first color plane, wherein resizing the first color plane comprises adding a plurality of new pixels to the first color plane, the resized first color plane comprising at least a first localized portion, wherein the first localized portion comprises:
  at least a first new pixel;
  a first known pixel having a first value; and
  a second known pixel having a second value;
generating an estimated value for the first new pixel, wherein the estimated value is based on the first value and the second value;
refining the estimated value;
using the refined estimated value for the first new pixel of the resized first color plane; and
merging the resized first color plane with the plurality of additional color planes.

10. The computer storage medium of claim 9, wherein refining the estimated value further comprises:
  determining an edge in the first localized portion;
  identifying at least one known pixel on the same side of the edge as the first new pixel; and
  adjusting the estimated value of the first new pixel based on the at least one known pixel.

11. The computer storage medium of claim 9, wherein the first color plane is resized according to a zoom factor.

12. The computer storage medium of claim 11, wherein the method further comprises:
  prior to resizing the first color plane, calculating a histogram; and
  performing luminosity compensation, wherein the luminosity compensation is based at least in part on the histogram.

13. The computer storage medium of claim 12, wherein the histogram is calculated based upon one of:
  the image; and
  the first color plane.

14. The computer storage medium of claim 12, wherein performing luminosity compensation further comprises:
  determining an average intensity using the histogram;
  calculating an adjustment value based at least on the average intensity and the zoom factor; and
  applying the adjustment value to the first color plane.

15. A system comprising:
  at least one processor; and
  memory encoding computer executable instructions that, when executed by the at least one processor, perform a method of performing localized upsampling of an image, the method comprising:
    converting an image into a color space;
    splitting the converted image, wherein splitting the image comprises generating a first color plane and a plurality of additional color planes;
    resizing the first color plane, wherein resizing the first color plane comprises adding a plurality of new pixels to the first color plane, the resized first color plane comprising at least a first localized portion, wherein the first localized portion comprises:
      at least a first new pixel;
      a first known pixel having a first value; and
      a second known pixel having a second value;
    generating a first estimated value for the first new pixel, wherein the first estimated value is based on the first value and the second value;
    refining the first estimated value;
    using the refined first estimated value for the first new pixel of the resized first color plane; and
    merging the resized first color plane with the plurality of additional color planes.

16. The system of claim 15, wherein the method further comprises:
  resizing a second color plane from the plurality of additional color planes, wherein resizing the second color plane comprises adding a plurality of new pixels to the second color plane, the resized second color plane comprising at least a second localized portion, wherein the second localized portion comprises:
    at least a second new pixel;
    a third known pixel having a third value;
    a fourth known pixel having a fourth value;
    a fifth known pixel having a fifth value; and
    a sixth known pixel having a sixth value;
  generating a second estimated value for the second new pixel, wherein the second estimated value is based on the third value, the fourth value, the fifth value, and the sixth value; and
  refining the second estimated value.

17. The system of claim 16, wherein merging the resized first color plane with the plurality of additional color planes comprises merging at least the resized first color plane and the resized second color plane.

18. The system of claim 16, wherein the color space is one of:
  an RGB color model;
  a YUV color model;
  a YCbCr color model;
  a YPbPr color model; and
  a Y'IQ color model.

19. The system of claim 16, wherein generating the second estimated value comprises determining an average of the third value, fourth value, fifth value, and sixth value.

20. The system of claim 16, wherein refining the second estimated value further comprises:
  determining an edge in the second localized portion;
  identifying at least one known pixel on the same side of the edge as the second new pixel; and
  adjusting the second estimated value of the second new pixel based on the at least one known pixel.

* * * * *